United States Patent [19]
Klebe et al.

[11] 3,806,590
[45] Apr. 23, 1974

[54] PROCESS FOR THE PRODUCTION OF CHLORINE

[75] Inventors: Hans Klebe; Alfred Meffert; Albert Langenfeld, all of Rheinfelden, Germany

[73] Assignee: Deutsche Gold-und Silber-Scheideanstalt vormals Roessler, Frankfurt (Main), Germany

[22] Filed: July 5, 1972

[21] Appl. No.: 269,142

[30] Foreign Application Priority Data
July 30, 1971 Germany.............................. 2138129

[52] U.S. Cl. .............................................. 423/507
[51] Int. Cl............................................. C01b 7/04
[58] Field of Search ............ 423/507, 504, 502, 500

[56] References Cited
UNITED STATES PATENTS

| | | | |
|---|---|---|---|
| 2,545,314 | 3/1951 | Seebold | 423/481 |
| 2,909,240 | 10/1959 | Colton | 55/71 |
| 3,716,628 | 2/1973 | Klebe et al. | 423/507 |

Primary Examiner—Oscar R. Vertiz
Assistant Examiner—Brian E. Hearn
Attorney, Agent, or Firm—Cushman, Darby & Cushman

[57] ABSTRACT

Chlorine is produced from hydrogen chloride absorbed in water or hydrochloric acid by reacting with hydrogen peroxide utilizing 1.0 to 4.5 moles of calcium chloride in the reaction solution.

5 Claims, 1 Drawing Figure

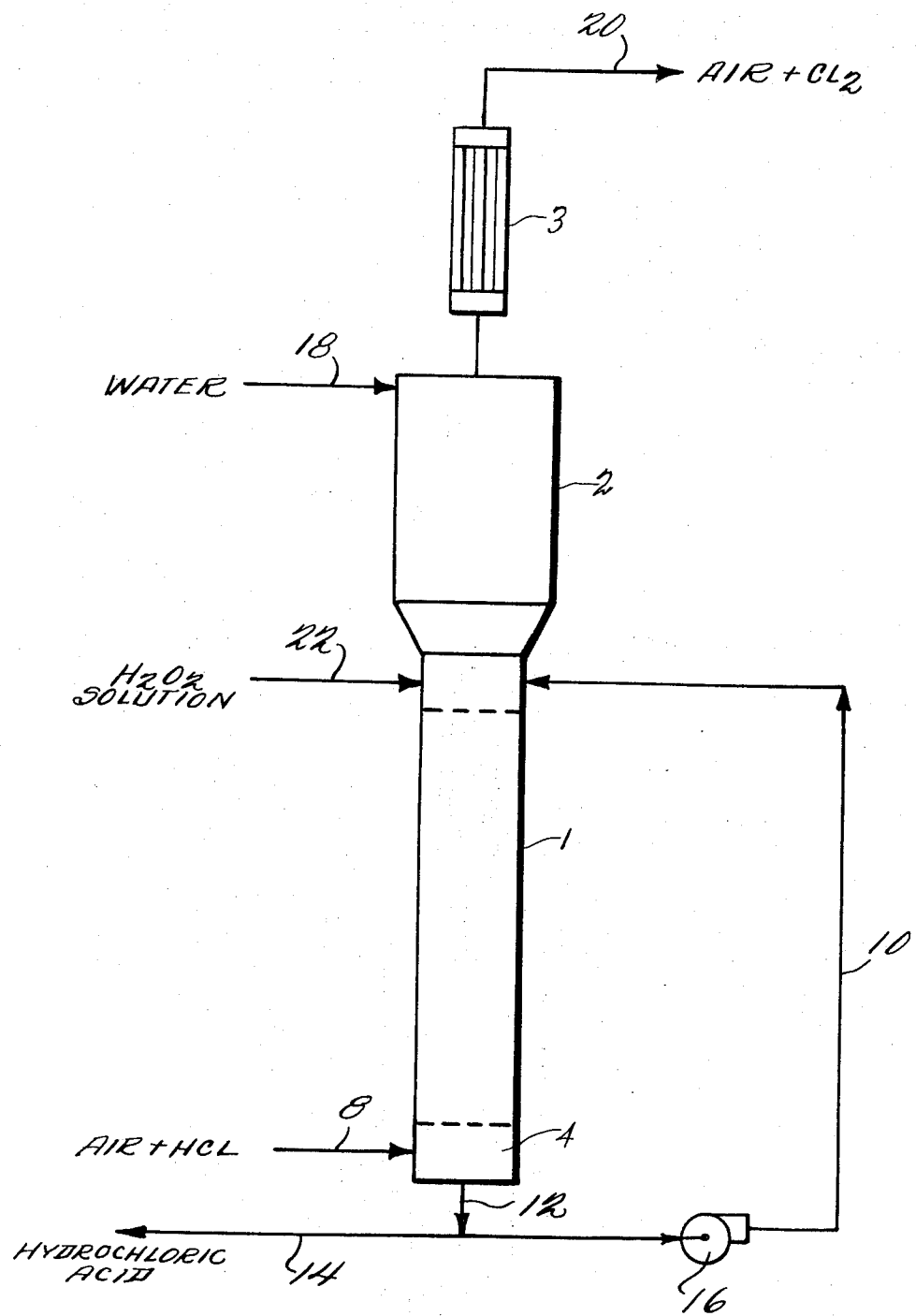

PROCESS FOR THE PRODUCTION OF CHLORINE

The present invention is directed to an improvement in the process for the production of chlorine from hydrogen chloride containing gases and hydrogen peroxide by converting the hydrogen chloride to an aqueous solution and reacting the solution with the hydrogen peroxide to form chlorine, removing chlorine from the aqueous phase and recovering the chlorine described in Klebe et al. application Ser. No. 92,370 filed Nov. 24, 1970, now U.S. Pat. No. 3,716,628, and German application P1963946.4. The entire disclosures of the aforementioned Klebe et al application 92,370 and German application P1963946.4 are hereby incorporated by reference.

As stated the Klebe et al. application and German application P1963946.4 describe a process for the production of chlorine from hydrogen chloride or hydrogen chloride containing gases by oxidation of the hydrogen chloride absorbed in water or hydrochloric acid with hydrogen peroxide. The process consists of reacting an aqueous hydrogen chloride solution containing 20–40 weight percent, preferably 25–35 weight % HCl with aqueous hydrogen peroxide solution containing up to 90 weight percent, preferably 40–70 weight % $H_2O_2$ and continuously removing the chlorine formed from the aqueous phase by use of reduced pressure and/or blowing out with rinsing gas. For economical reasons a 50 weight percent hydrogen peroxide fraction obtained by the anthraquinone process is employed. The $H_2O_2$ concentration can be as low as 30 weight percent. The hydrogen peroxide is usually added in an amount of 0.8 to 0.9 moles per 2 moles of HCl.

As stated in Klebe et al application 92,370, the hydrogen chloride to be reacted can be absorbed in water until attaining the provided hydrochloric acid concentration (for example 25–35 weight percent). In a preferred form of the process of the Klebe et al. application, however, it is absorbed immediately in hydrochloric acid of the desired concentration.

According to another preferred form of the process of said Klebe et al application the hydrochloric acid used as the absorption agent for the gaseous hydrogen chloride is held at a temperature which at most, is about 20° C above normal temperature i.e. is not over about 40° C and generally is between 27° C and 35° C. The selection of the optimum absorption temperature generally is adjusted according to the inert gas portion in a gas mixture containing HCl.

As inert gases there frequently are present nitrogen, air, steam, carbon dioxide and mixtures thereof. The inert gas can amount from 9 to nearly 100 volume percent of the entire gaseous mixture. If the portion of inert gas is high, in order to avoid escape of HCl gas from the top of the absorption column, the temperature must be controlled by scrubbing with hydrochloric acid to sufficiently reduce the partial pressure of hydrogen chloride.

The reaction occurs at normal temperatures, or slightly above with sufficient speed so that no additional heat energy must be applied. The reaction partners, hydrogen chloride and hydrogen peroxide, depending on the procedure for carrying out the process, can be brought together at the temperature provided for the absorption agent or at the temperature which occurs because of the exothermic heat of reaction of the oxidation reaction in the reaction medium. The latter temperature for carrying out the process is usually below 60° C.

The liberation from the reaction medium of the chlorine formed in the reaction can be influenced in carrying out the reaction at reduced pressure, e.g. 0.2 to 0.95 atm. It is suitable to blow out the chlorine from the aqueous phase by means of rinsing gas, preferably air, or by means of a combination of reduced pressure and rinsing gas to remove the chlorine.

Unreacted hydrochloric acid, after cooling to the absorption temperature, can be added again as absorption agent.

The process can be carried out batchwise or continuously. In continuous operation, in order to maintain the hydrochloric acid concentration provided, the water introduced with the hydrogen peroxide, together with the water formed in the reaction can be drawn off in the form of dilute hydrochloric acid. A reduction in the hydrochloric acid concentration provided can be counteracted by addition of hydrogen chloride gas.

The chlorine gas obtained from the reaction according to another suitable form of the Klebe et al. invention is washed countercurrently by means of cold, e.g. −20° to +15° C and preferably about 0° C., hydrochloric acid of the concentration provided (for example 25 – 35 % HCl), whereby small amounts of hydrogen chloride contained in the chlorine gas can be removed in a given case.

For continuous carrying out of the process of the Klebe et al invention the following procedures have proven especially suitable:

According to a preferred industrial approach of the process the hydrogen chloride is separated from the hydrogen chloride containing gas, for example, a gaseous mixture of HCl, steam and air, first, by, in a given case, a multi-step counter-current wash with hydrochloric acid of the provided concentration and in a given case, thereafter with water, then from the eluate the heat of absorption is withdrawn before the reaction with hydrogen peroxide, then the cooled eluate is led in concurrent flow to the hydrogen peroxide over the packed filling of a reaction tower, then the chlorine gas formed is removed in countercurrent flow and a partial stream of the diluted hydrochloric acid returning to the absorption step is discharged in order to remove excess water.

This method permits the recovery of chlorine even from gaseous mixtures of very low HCl content.

Another preferred continuous process of the Klebe et al invention consists in separating the hydrogen chloride from the hydrogen chloride containing gases by, in a given case, multi-step countercurrent wash with hydrochloric acid of the provided concentration and, in a given case, thereupon with water, boiling hydrogen chloride out of the eluate until the azeotrope is reached (about 22 percent hydrochloric acid), leading the desorbed hydrogen chloride countercurrent to the hydrochloric acid of the provided concentration and to the hydrogen peroxide and in the direction of flow of the chlorine formed over the packing of a reaction tower, returning a partial flow of the diluted hydrochloric acid formed back to the reaction and removing azeotrope hydrochloric acid for the purpose of discharging the excess water.

In this method there takes place inside the reaction tower, besides the oxidation of the hydrogen chloride, a subsequent concentration of the hydrochloric acid fed which counteracts the dilution effect produced by the water brought in with the hydrogen peroxide and the water of reaction.

A third possibility according to the Klebe et al. invention for a practical carrying out of the process consists in conveying the hydrogen chloride immediately into the aqueous medium without previous separation of accompanying gases and simultaneously reacting with hydrogen peroxide as a result of which there is obtained as the reaction product chlorine gas diluted with the accompanying gases.

The processes essentially depend upon leading hydrogen chloride from hydrogen chloride containing gases countercurrently to hydrochloric acid of the provided concentration and to hydrogen peroxide and in the direction of flow of the chlorine formed over the packing of a column serving as a reactor, washing the chlorine formed and the residual gas with water, for example, in a subsequently placed bubble plate column, returning the draining hydrochloric acid after cooling to the provided absorption temperature to the reactor, desorbing hydrogen chloride from a partial stream of the draining hydrochloric acid until the azeotrope is obtained in order to return it to the reaction and removing azeotrope hydrochloric acid for the purpose of discharging excess water.

This process variant especially makes possible a particularly compact apparatus arrangement; it is preferably selected if gases of high HCl content are available.

The yields of chlorine gas produced in the process of the invention are high and, based on the $H_2O_2$ in practice, generally are above 90 percent.

No special apparatus is needed for carrying out the process. For absorption and reaction there can be used counter-current washers of any design, as for example, packing loaded countercurrent columns and the like. The desorption of HCl from hydrochloric acid to obtain the azeotropically boiling solution (about 22 percent concentration) can take place by means of customary distillation apparatus.

It has now been found unexpectedly that the already good chlorine yields of the process of Klebe et al. application Ser. No. 92,370 and German application P1963946.4 can be further improved if the reaction is carried out in the presence of dissolved calcium chloride. This procedure further permits the HCl content of hydrogen chloride solution to be reduced well below that previously possible.

The object of the invention is to improve the process for the production of chlorine from hydrogen chloride or hydrogen chloride containing gases by reaction of the hydrogen chloride absorbed in water or hydrochloric acid with hydrogen peroxide according to Klebe et al. application 92,370 (German application P1963946.4) wherein aqueous hydrogen chloride is reacted with aqueous hydrogen peroxide content below 90 weight percent, e.g. as low as 30 weight percent, preferably 40 to 70 weight % $H_2O_2$ and the chlorine formed is continuously removed from the aqueous phase by use of reduced pressure and/or blowing out with rinsing gas which is characterized by carrying out the reaction in the presence of 1.0 to 4.5 moles of calcium chloride ($CaCl_2$) per liter of reaction solution and wherein the hydrogen chloride has an HCl content of 5 – 40 weight percent, preferably 8 – 35 weight percent. The necessary calcium chloride is usually added in at least one of the solutions of the reactants.

The addition of calcium chloride is advantageous in all of the concentration range of Klebe et al. application Ser. No. 92,370 and expands the range of the HCl concentration to a lower concentration.

Corresponding to the process of Klebe et al. application, Ser. No. 92,370 the water brought in with the hydrogen peroxide and that formed in the reaction must again be discharged. Thereupon naturally a corresponding amount of calcium chloride is removed and which must be again added to the process. This can take place by addition of one of the reactants or by evaporation and return of the hydrochloric acid drawn off. However, it is also possible to install in the cycle a column filled with solid calcium chloride in which the reaction solution again can be concentrated to the desired salt content.

The invention will be understood best in connection with the accompanying drawings wherein the single FIGURE is a schematic illustration of an apparatus for carrying out the process of the invention.

Unless otherwise indicated all parts and percentages are by weight.

The abbreviation $Nm^3$ indicates normal cubic meters, i.e. the volume at standard temperature and pressure (STP).

EXAMPLE 1

Referring to the drawings a gaseous mixture consisting of 315 $Nm^3$/hour of air (corresponding to 408 kg/h of air) and 78.5 $Nm^3$/hour HCl gas (=20 volume percent and corresponding to 128.5 kg/hour HCl) were fed through conduit 8 into the bottom of packed column 1 having a diameter of 350 mm and a filled height of 2,000 mm. The column was scrubbed hourly with 5 $Nm^3$ of an 8 percent hydrochloric acid having a temperature of 75° C. and which also contained 2325 kg of $CaCl_2$ (equal to 4.2 moles/l of $CaCl_2$) introduced via conduit 10. The hydrochloric acid-calcium chloride left the absorption column via conduit 12, a portion was drawn off through conduit 14 and the remainder returned to the column with the aid of pump 16 via conduit 10 as indicated. The residual hydrogen chloride from the gaseous mixture was rinsed in a subsequently provided bubble tray column 2 to which was admitted 50 l/h of water from conduit 18 and the draining hydrochloric acid was admixed with the hydrochloric of the main absorption. An after provided condenser 3 insures that no steam can escape with the gaseous mixture of air and chlorine drawn off via conduit 20.

There were also added to the head of column 1 through conduit 22 105 kilograms/h of a 50 percent aqueous peroxide solution. There were drawn off above the condenser 3 of column 1 hourly 315 $Nm^3$/h of air and 103 kilograms of chlorine.

From columm 1 the calcium chloride containing hydrochloric acid ran into a sump 4 and was from there heated to 75° C. and again returned to column 1 again via conduit 10.

From the cycle there were withdrawn hourly 282 kilograms of 8 percent hydrochloric acid which also contained 101 kilograms of $CaCl_2$ that must again be added to the process in the absorption side in dry form.

The yields were computed as follows

HCl reaction
Hydrogen chloride brought in as hydrochloric acid    128.5 kg/h
Theoretical chlorine yield based thereon             125 kg/h
Chlorine obtained                                    103 kg/h
Corresponding to a yield of about 83%
$H_2O_2$ Reaction
$H_2O_2$ (100%) added                                52.5 kg/h
Theoretical chlorine yield based thereon             109.5 kg/h
Corresponding to a $H_2O_2$ yield of about 94%.

What is claimed is:

1. A process for the production of chlorine from hydrogen chloride containing gases and hydrogen peroxide comprising converting the hydrogen chloride to an aqueous solution containing 5 to 40 weight % HCl and reacting said solution with aqueous 30 to 90 percent hydrogen peroxide in the presence of 1.0 to 4.5 moles of calcium chloride per liter of reaction solution to form chlorine and removing the chlorine from the aqueous phase and recovering the chlorine.

2. A process according to claim 1 wherein the calcium chloride is added in solution with one of the reactants.

3. A process according to claim 1 wherein the HCl content is eight to 35 weight percent.

4. A process according to claim 1 wherein the hydrogen peroxide solution contains 40 – 70% $H_2O_2$.

5. A process according to claim 1 wherein the aqueous HCl solution has a temperature of 27° – 40° C.

* * * * *